Feb. 12, 1963 S. A. BUTLER 3,077,585

SHIFT REGISTER

Filed Oct. 27, 1958 3 Sheets-Sheet 1

INVENTOR.
SAMMY A. BUTLER

BY William V. Schelberg
AGENT

Feb. 12, 1963 S. A. BUTLER 3,077,585

SHIFT REGISTER

Filed Oct. 27, 1958 3 Sheets-Sheet 3

United States Patent Office 3,077,585

Patented Feb. 12, 1963

3,077,585
SHIFT REGISTER

Sammy A. Butler, Peekskill, N.Y., assignor to International Business Machines Corporation, New York, N.Y., a corporation of New York Filed Oct. 27, 1958, Ser. No. 769,838
9 Claims. (Cl. 340—174)

This invention relates to shifting registers and more particularly to diodeless type shifting registers which employ magnetic core components and a capacitor in their transfer circuits.

Shifting registers and the like help perform many computer functions such as multiplication and division and a constant effort has been underway to both increase their reliability and operating speeds. This effort is exemplified by a prior art which is replete with the variety of magnetic core shifting registers. Recently, in accordance with this effort, the diode employed in such registers to prevent retrograde transfer of information has been eliminated by unique pulsing techniques as shown, for example, in a copending application Serial No. 528,594, now Patent No. 2,907,987, filed August 16, 1955, in behalf of Louis A. Russell. By employng these unique pulsing techniques, the reliability of magnetic core transfer circuits has been materially increased with, however, a sacrifice of operating speeds. Thus, there has been a need for diodeless type shifting registers wherein each of the transfer circuits has a minimum number of components, a high degree of reliability and is capable of operating at high speeds.

By constructing circuits for shifting registers in accordance with this invention wherein each stage comprises a first and second bistable core and a capacitor serially connected with a winding on each of the cores, both higher operating speeds and reliability are attained. In a register which is constructed in accordance with this invention, information is transferred by resetting the second core of one stage to a datum stable state to provide a current in its transfer loop which immediately initiates switching of the first core associated with the next succeeding stage to an opposite stable state since the capacitor in this transfer loop momentarily acts as a short circuit impedance. Simultaneously then, the first capacitor connected with the second core which is reset starts charging and the aforementioned first core starts switching to induce a voltage and provide a current in the succeeding stage transfer circuit which charges another capacitor, which may be referred to as the second stage capacitor. After the aforementioned first core is fully switched, both condensers simultaneously discharge to provide a current from the first capacitor which resets the first core of the succeeding stage to the datum stable state and a current from the second stage capacitor which switches the second core of the second stage to the opposite stable state. The unique action of the capacitors upon discharging is controlled by utilizing the internal energy losses of the first core in transferring energy from one circuit into another which losses, heretofore, were considered detrimental and a distinct disadvantage. This control upon the discharge of the capacitors is provided by the current in the transfer loop of the second core that is reset, which charges the first capacitor connected with the core reset to a given potential, but, since energy losses take place when transferring the energy provided in this circuit through the first core, the second stage capacitor charges to a potential of lesser magnitude. Further, by employing this novel arrangement and control in such circuits, the number of turns in the windings coupling adjacent stages through the first core of each stage may be equal, allowing bi-directional information handling.

Accordingly, it is a prime object of this invention to provide new and improved shifting registers.

A further object of this invention is to provide new and improved reversible shifting registers.

Still a further object of this invention is to provide diodeless magnetic core shifting registers which employ the inherent characteristics of a capacitor in their transfer circuits.

A further object of this invention is to provide a diodeless magnetic core shifting register which does not require the use of reset windings on the cores.

Yet another object of this invention is to provide coupling circuits in which the inherent losses accompanying transfer of information through magnetic components are advantageously utilized.

Another object of this invention is to provide a new and improved device for coupling adjacent circuits in a system adapted to bi-directional information handling.

Other objects of this invention will be pointed out in the following description and claims and illustrated in the accompanying drawings, which disclose, by way of example, the principle of the invention and the best mode, which has been contemplated, of applying that principle.

Figure 1:
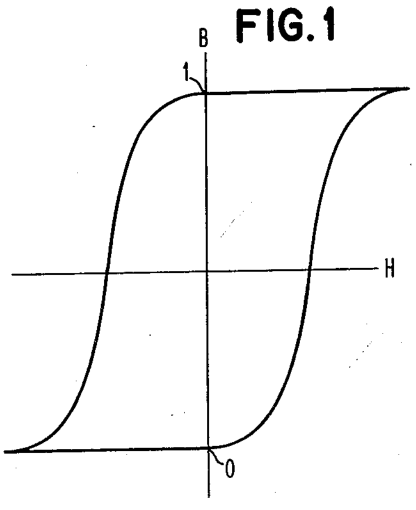
FIG. 1 is a representation of the hysteresis characteristic obtained for a magnetic material of the type employed.

Referring to the FIG. 1, the curve illustrated comprises a plot of flux density (B) versus applied field (H) for the magnetic type material of a core having a substantially rectangular hysteresis characteristic. The opposite remanent states are conventionally employed for representing binary information and are arbitrarily designated as "0" and "1" in the figure. With a "0" stored, a pulse applied to a winding linking the core in proper senses causes the loop to be traversed and the remanence state "1" is obtained when the pulse terminates. Such a pulse is hereinafter referred to as a "write" signal. Similarly, the core is read out or returned to the "0" state in determining what information has been stored by applying a pulse in reverse sense to the same or another winding. Such a pulse is hereinafter referred to as a "read" signal. Should a "1" have been stored, a large flux change occurs with the shift from the "1" to the "0" conditions with a corresponding voltage magnitude developed on the output winding. On the other hand, should a "0" have been stored, little flux change occurs and negligible signal is developed on the output winding.

A dot marking is shown adjacent one winding terminal of each of the windings shown in the FIGS. 2, 3, 4, 6 and 7, indicating its winding direction in that a positive pulse directed into the dotted end tends to apply a negative field or store a "0," termed a read signal, while a positive pulse directed into the unmarked end tends to store a "1," termed a write signal.

The arrangements disclosed employ input and output coupling magnetic cores arranged intermediate to so call storage magnetic cores which store certain logical information and these arrangements are adapted to be interconnected with further similar type circuitry through such coupling cores. The coupling cores may be fabricated of ferrite materials like the storage cores, however, it is not essential that they exhibit the rectangular hysteresis characteristic required of the storage or memory cores, but should have a good $B_r/B_s$ ratio as these devices function as variable impedance elements in controlling the transfer of information pulses, as will be more evident from the following descriptions.

Figure 2:
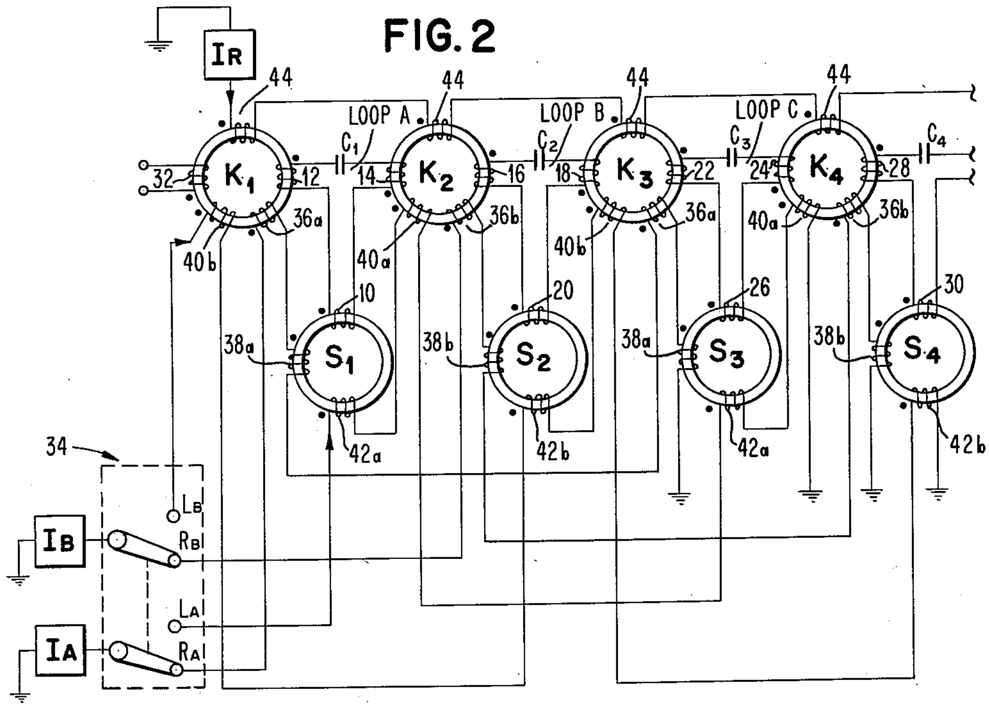
FIG. 2 is a circuit diagram of a reversible shifting register in accordance with one embodiment of this invention.

Referring to the FIG. 2, such interconnecting coupling cores are illustrated in the circuit and labeled $K_1$, $K_2$, $K_3$ and $K_4$, while the storage cores are labeled $S_1$, $S_2$, $S_3$ and $S_4$ for clarity. The transfer of information is provided by the storage core S which is adapted to receive input information through the coupling cores and deliver this information through the coupling core of the following stage. The storage core $S_1$ is provided with a control winding 10, which is adapted to act as an input and an output winding, interconnected with a winding 12 on the core $K_1$ and a winding 14 on the core $K_2$ through a capacitor $C_1$, which interconnection is hereinafter referred to as loop A. The coupling core $K_2$ is also provided with a winding 16 which is interconnected with a winding 18 on the core $K_3$ through a capacitor $C_2$ and a control winding 20 on the core $S_2$, which interconnection is hereinafter referred to as loop B. The coupling core $K_3$ is also provided with a winding 22 interconnected with a winding 24 on the core $K_4$ through a capacitor $C_3$ and a control winding 26 on the core $S_3$, which interconnection is hereinafter referred to as loop C. The coupling core $K_4$ is also provided with a winding 28 interconnected with a capacitor $C_4$ and a control winding 30 on the core $S_4$ to provide a signal to a further logical stage which may comprise a further coupling core K of similar type circuitry. The coupling core $K_1$ is also provided with a winding 32 which for shift right operation is adapted to receive binary input information and transfer this information through the core $K_1$ to the core $S_1$.

A clock pulse source $I_A$ and a clock pulse source $I_B$ are provided connected with common terminals of a double pole, double throw switch 34. One terminal of the switch 34 is labeled $R_A$, another terminal is labeled $R_B$, still another is labeled $L_A$ and another is labeled $L_B$. A shift winding **36*a* is provided on each of the odd numbered coupling cores $K_1$ and $K_3$, while a shift winding 36*b* is provided on each of the even numbered coupling cores $K_2$ and $K_4$. Similarly, a shift winding 38*a* is provided on each of the odd number storage cores $S_1$ and $S_3$, while a shift winding 38*b* is provided on each of the even numbered storage cores $S_2$ and $S_4$. Each of the shift windings 36*a* on the cores $K_1$ and $K_3$ are connected with the shift windings 38*a* on the cores $S_1$ and $S_3$ in series with the terminal $R_A$ of the switching 34, while each of the shift windings 36*b* on the cores $K_2$ and $K_4$ are connected with the shift winding 38*b* on the cores $S_2$ and $S_4$ in series with the terminal $R_B$ of the switch 34. When the switch 34** is in a position connecting the sources $I_A$ and $I_B$ to the terminals $R_A$ and $R_B$, respectively, the register is adapted to shift information to the right.

A shift winding **40*a* is also provided on each of the even numbered coupling cores $K_2$ and $K_4$, while a further shift winding 40*b* is provided on each of the odd number coupling cores $K_1$ and $K_3$. A further shift winding 42*a* is also provided on each of the odd numbered storage cores $S_1$ and $S_3$, while a further shift winding 42*b* is also provided on each of the even numbered storage cores $S_2$ and $S_4$. Each of the shift windings 40*a* on the cores $K_2$ and $K_4$ are connected with each of the shift windings 42*a* on the cores $S_1$ and $S_3$ in series with the terminal $L_A$ of the switch 34, while each of the shift windings 40*b* on the cores $K_1$ and $K_3$ are connected with each of the shift windings 42*b* on each of the storage cores $S_2$ and $S_4$ in series with the terminal $L_B$ of the switch 34. When the switch 34 is in a position connecting the sources $I_A$ and $I_B$ to the terminals $L_A$ and $L_B$, respectively, the register is then adapted to shift information to the left. Also provided on each of the coupling cores $K_1$, $K_2$, $K_3$ and $K_4$ is a further shift winding 44** which windings are connected in series with the source $I_R$.

Figure 5:
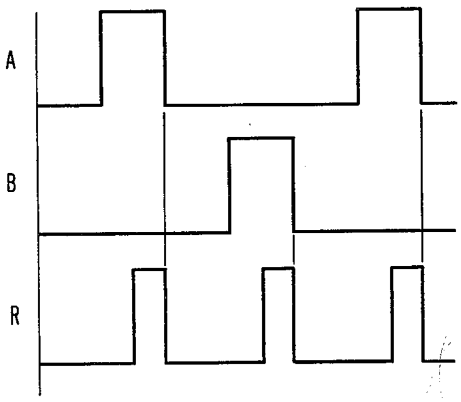
FIG. 5 illustrates the relative timing of current pulses which are required for operation of the circuit shown in the FIG. 2.
Figure 3:
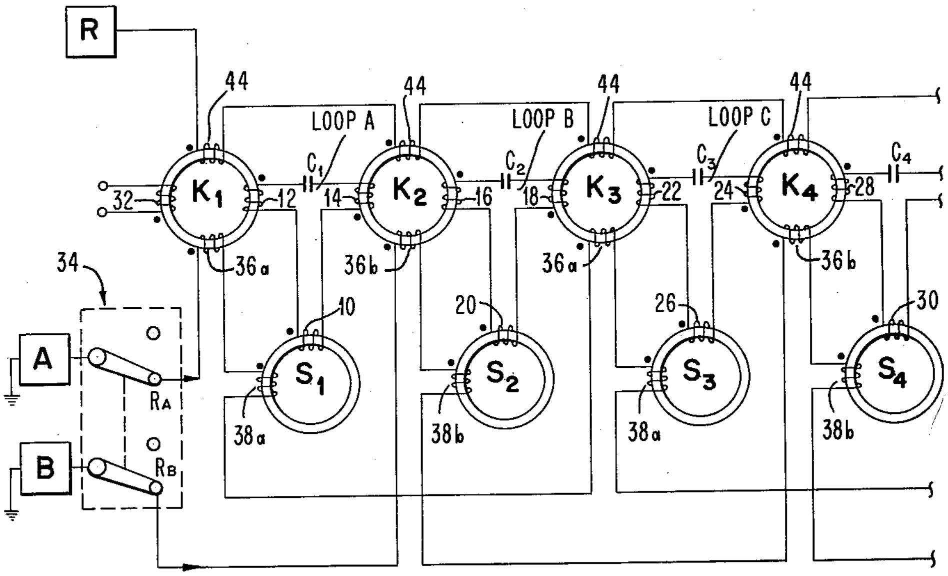
FIG. 3 is the circuit of FIG. 2 with elimination of the inactive shift windings when shift right operation is initiated.
Figure 4:
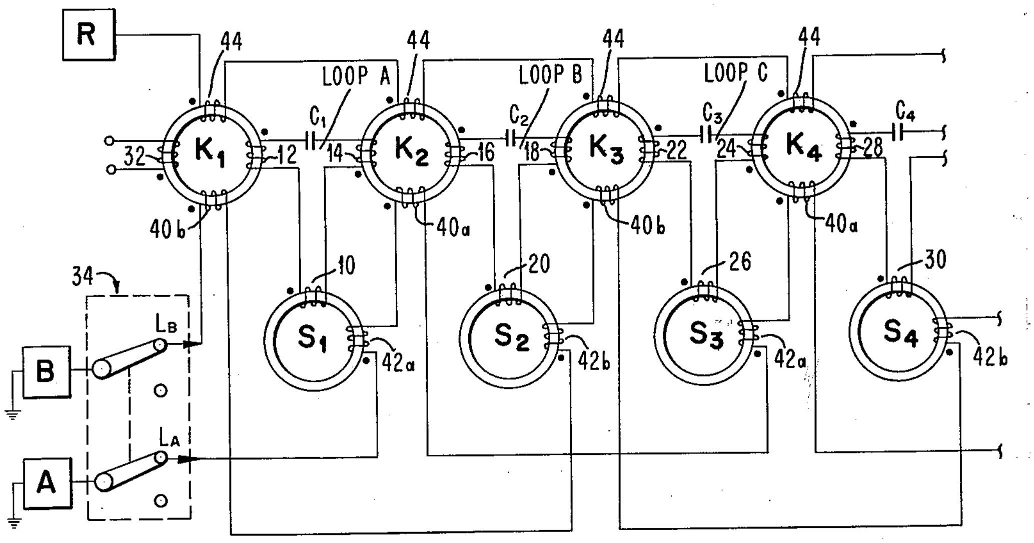
FIG. 4 is the circuit of FIG. 2 with the elimination of the inactive shift windings when shift left operation is initiated.

The sequence of pulses provided by the several clock pulse sources described above is as indicated in the FIG. 5, shown as sources A, B and C to designate sources $I_A$, $I_B$ and $I_C$, respectively and in order to crystallize an understanding of how the register of FIG. 2 may perform the shift right and shift left operations, the FIG. 3 is utilized to illustrate the equivalent circuit of the register of FIG. 2 when the switch 34 is in a position connecting the sources $I_A$ and $I_B$ to the terminals $R_A$ and $R_B$, respectively, for shift right operation, while the FIG. 4 is utilized to illustrate the equivalent circuit of the register of FIG. 2 when the switch 34 is in a position connecting the sources $I_A$ and $I_B$ to the terminals $L_A$ and $L_B$, respectively, for shift left operation. It should be noted that in both the FIGS. 3 and 4, the sources $I_A$ and $I_B$ are shown as A and B, but will be referred to in the detailed description to follow as the sources $I_A$ and $I_B$.

Assuming the switch 34 is positioned for shift right operation and all cores are in the lower remanence condition, or "0" state, except the core $S_1$ which is in the "1" state as shown in the FIG. 1, operation of the register of FIG. 2 will be hereinafter explained with reference to the FIG. 3. Referring to the FIG. 3, when the $I_A$ clock pulse source operates, a read signal is directed to windings **36*a* and 38*a* on the cores $K_1$, $K_3$ and the cores $S_1$ and $S_3$, respectively, which resets the core $S_1$ from the "1" to the "0" state and in so doing induces a voltage on the control winding 10 of the core $S_1$ with the dotted end positive to cause a clockwise current in loop A which tends to write the cores $K_1$ and $K_2$ and charge the capacitor $C_1$. Since the core $K_1$ is held in the "0" state at this time by the $I_A$ clock pulse directed to its winding 36*a* the capacitor $C_1$ starts charging and the core $K_2$ starts switching from the "0" to the "1" state. As the core $K_2$ switches toward the "1" state, a voltage is induced on the winding 16 with the undotted end positive to cause a counterclockwise current in loop B which tends to read the cores $S_2$ and $K_3$ and to charge the capacitor $C_2$ in a sense opposite to that of the capacitor $C_1$. Since the cores $S_2$ and $K_3$ are already in the "0" state at this time, they are uneffected and the capacitor $C_2$ is charged. When the rate of change of flux in the core $K_2$ reaches a maximum and starts decreasing, the capacitor $C_2$ discharges to cause a clockwise current in loop B. At this time, the $I_R$ clock pulse source operates to direct a read signal into each of the windings 44 on the coupling cores $K_1$, $K_2$, $K_3$ and $K_4$, which starts resetting the core $K_2$ from the "1" to the "0" state. The core $K_2$ in switching towards the "0" state induces a voltage on the windings 14 and 16 with their dotted end positive, tending to cause a clockwise current in both the loops A and B. The currents in the loop B due to the capacitor $C_2$ discharging and the core $K_2$ switching toward the "0" state are additive, increasing the discharge rate of the capacitor $C_2$ and thus causing a large clockwise current in loop B which tends to write the cores $K_3$ and $S_2$. Since the core $K_3$ is held in the "0" state by the $I_R$ clock pulse directed into its winding 44, the core $S_2$ is fully switched from the "0" to the "1" state. The clockwise current in loop A due to the core $K_2$ resetting to the "0" state by the $I_R$ clock pulse directed into its winding 44**, tends to charge the capacitor $C_1$ to a higher voltage. After the core $K_2$ is reset to the "0" state, the capacitor $C_1$ discharges to cause a counterclockwise current in loop A which tends to read the cores $K_1$, $S_1$ and $K_2$. Since the cores $K_1$, $K_2$ and $S_1$ are already in the "0" state, this current has no effect and all cores are left in the "0" state after termination of the $I_A$ and $I_R$ clock pulses except the core $S_2$ which is left in the "1" state.

Subsequently, the $I_B$ clock pulse source operates to direct a read signal into the windings 36b on the cores $K_2$ and $K_4$ and the windings 38b on the cores $S_2$ and $S_4$, respectively, which switches the core $S_2$ from the "1" to the "0" state and in so doing induces a voltage on the control winding 20 with the dotted end positive. This voltage induced on the control winding 20 tends to cause a clockwise current in loop B which tends to switch each of the cores $K_2$ and $K_3$ to the "1" state and to charge the capacitor $C_2$. Since the core $K_2$ is held in the "0" state by the $I_A$ clock pulse directed into its winding 36b, the core $K_3$ starts switching from the "0" to the "1" state and the condenser $C_2$ starts charging. As the core $K_3$ switches towards the "1" state, a voltage is induced on the winding 22 with the undotted end positive causing a counter-clockwise current in loop C which tends to read the cores $S_3$ and $K_4$ and to charge the capacitor $C_3$ in a sense opposite to the charge on the condenser $C_2$ in the loop B. Since each of the cores $S_3$ and $K_4$ are in the "0" state at this time, they are uneffected and the condenser $C_3$ is charged. When the rate of change of flux in the core $K_3$ reaches a maximum and starts decreasing, the capacitor $C_3$ discharges and causes a clockwise current in loop C. At this time, the $I_R$ clock pulse source operates to direct a read signal into the winding 44 on each of the cores $K_1$, $K_2$, $K_3$ and $K_4$ which causes the core $K_3$ to be reset from the "1" to the "0" state and in so doing causes a voltage to be induced on the windings 18 and 22 with their dotted end positive. The voltage induced on the winding 22 tends to cause a clockwise current in loop C which increases the discharge rate of the capacitor $C_3$ and tends to write the cores $K_4$ and $S_3$. Since the core $K_4$ is held in the "0" state by the $I_R$ clock pulse directed into its winding 44 at this time, only the core $S_3$ is switched from the "0" to the "1" state. The voltage induced on the winding 18 due to the core $K_3$ being reset to the "0" state causes a clockwise current in loop B which tends to write the cores $S_2$ and $K_2$ and charge the capacitor $C_2$ to a higher voltage. Since the cores $S_2$ and $K_2$ are held in the "0" state at this time by the $I_B$ clock pulse directed into the windings 36b and 38b, respectively, the capacitor $C_2$ is charged to a higher voltage. After the core $K_3$ is reset the capacitor $C_2$ discharges to cause a counter-clockwise current in loop B which tends to read the cores $K_2$, $S_2$ and $K_3$. Since the cores $K_2$, $S_2$ and $K_3$ are already in the "0" state, they are uneffected. Thus upon operation of the $I_A$ and $I_B$ clock pulse sources the information originally retained in the core $S_1$ has been transferred from the core $S_1$ to the core $S_2$ and thence to the core $S_3$ leaving the core $S_3$ in the "1" state and all other cores in the "0" state and the register has thus performed shift right operation.

Assuming now that the switch 34 is positioned for shift left operation and all cores are in the lower remanence condition or "0" state except the core $S_3$ which was previously left in the "1" state, operation of the register of FIG. 2 will hereinafter be explained with reference to the FIG. 4. Upon operation of the $I_A$ clock pulse source, a read signal is directed into the winding 40a on the cores $K_2$ and $K_4$ and the windings 42a on the cores $S_1$ and $S_3$, which resets the core $S_3$ from the "1" to the "0" state to cause a voltage to be induced on the control winding 26 with the dotted end positive causing a clockwise current in loop C which tends to write the cores $K_3$ and $K_4$ and charge the condenser $C_3$. Since the core $K_4$ is held in the "0" state, by the $I_A$ clock pulse directed into its winding 40a, the core $K_3$ starts switching from the "0" to the "1" state and the condenser $C_3$ starts charging. As the core $K_3$ is switched from the "0" to the "1" state a voltage is induced on the winding 18 with its undotted end positive causing a clockwise current in loop B which tends to read the cores $K_2$ and $S_2$ and to charge the capacitor $C_2$. Since both the cores $K_2$ and $S_2$ are already in the "0" state, they are uneffected and the condenser $C_2$ is charged with a polarity opposite in sense to that of the condenser $C_3$. When the rate of change of flux in the core $K_3$ reaches a maximum and starts decreasing, the capacitor $C_2$ starts discharging to cause a clockwise current in loop B. At this time, the $I_R$ clock pulse source operates to direct a read signal into the winding 44 on the cores $K_1$, $K_2$, $K_3$ and $K_4$, which resets the core $K_3$ from the "1" toward the "0" state and in so doing inducing a voltage on the windings 18 and 22 with their dotted end positive. The voltage induced on the winding 18 due to the core $K_3$ being reset toward the "0" state causes a clockwise current in loop B which increases the rate of discharge of the condenser $C_2$ and tends to write the cores $S_2$ and $K_2$. Since the core $K_2$ is held in the "0" state by the $I_A$ clock pulse directed into its winding 40a, it is uneffected and the core $S_2$ is switched from the "0" to the "1" state. The voltage induced on the winding 22 due to the core $K_3$ being reset toward the "0" state causes a clockwise current in loop C tending to write the cores $K_4$ and $S_3$ and to charge the capacitor $C_3$ to a higher voltage. Since the cores $S_3$ and $K_4$ are held in the "0" state at this time by the $I_A$ clock pulse directed into the windings 42a and 40a respectively, the capacitor $C_3$ is recharged to a higher voltage and the cores $S_3$ and $K_4$ remain in the "0" state. When the core $K_3$ is fully reset to the "0" state, the capacitor $C_3$ discharges to cause a counter-clockwise current in loop C which tends to read the cores $K_3$, $K_4$ and $S_3$. Since the cores $K_3$, $S_3$ and $K_4$ are already in the "0" state, they are uneffected. Thus information has been transferred from the core $S_3$ into the core $S_2$ which is now in the "1" state and all the remaining cores are left in the "0" state.

Subsequent to the operation of the $I_A$ clock pulse source, the $I_B$ clock pulse source operates to direct a read signal into the windings 40b on the cores $K_1$ and $K_3$ and the windings 42b on the cores $S_2$ and $S_4$, respectively. The core $S_2$ is reset from the "1" to the "0" state and in so doing induces a voltage on the control winding 20 with the dotted end positive causing a clockwise current in loop B which tends to write the cores $K_2$ and $K_3$ and charge the capacitor $C_2$. Since the core $K_3$ is held in an "0" state by the $I_B$ clock pulse directed into its winding 40b, the core $K_2$ is switched from the "0" toward the "1" state and the condenser $C_2$ is charged. The core $K_2$ in switching toward the "1" state induces a voltage on the winding 14 with the undotted end positive causing a counter-clockwise current in loop A which tends to read the core $K_1$ and $S_1$ and charge the capacitor $C_1$ with a polarity opposite with that of the capacitor $C_2$. Since the cores $K_1$ and $S_1$ are already in the "0" state, only the capacitor $C_1$ is charged. When the rate of change of flux in the core $K_2$ reaches a maximum and starts decreasing, the capacitor $C_1$ starts discharging to cause a clockwise current in loop A. At this time, the $I_R$ clock pulse source operates to direct a read signal into the winding 44 on the core $K_2$ which resets the core $K_2$ from the "1" toward the "0" state causing a voltage to be induced on the windings 14 and 16 with their dotted end positive. The voltage induced on the winding 14 tends to cause a clockwise current in loop A which increases the discharge rate of the capacitor $C_1$ which tends to write the cores $S_1$ and $K_1$. Since the core $K_1$ is held in the "0" state by the $I_B$ clock pulse directed into its winding 40b, only the core $S_1$ is switched from the "0" to the "1" state. The voltage induced on winding 16 due to the core $K_2$ being reset toward the "0" state causes a clockwise current flow in loop B tending to write the cores $K_3$ and $S_2$ and charge the capacitor $C_2$ to a higher voltage. Since the cores $K_3$ and $S_2$ are held in the "0" state by virtue of the $I_B$ clock pulse directed into their windings 40b and 42b, respectively, the condenser $C_2$ is charged to a higher voltage. After the core $K_2$ is fully reset, the condenser $C_2$ starts discharging to cause a counter-clockwise current in loop B which tends to read the cores $K_2$, $S_2$ and $K_3$. Since the cores $K_2$, $S_2$, and $K_3$ are already in the "0" state they are uneffected. Thus information has been transferred, by operation of the $I_B$ clock pulse source, from the core $S_2$ to the core $S_1$.

Figure 6:
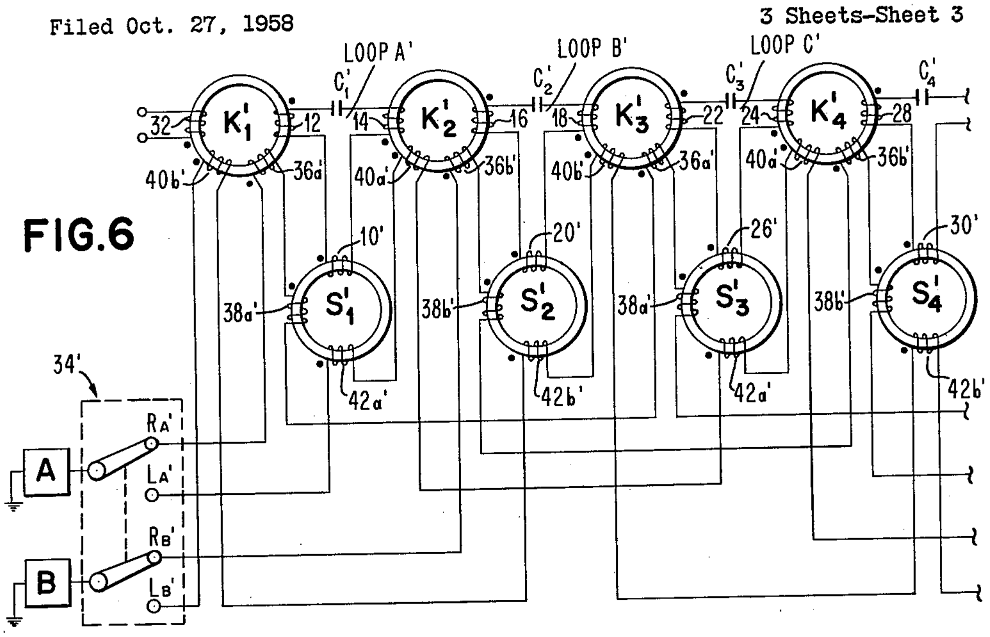
FIG. 6 is a circuit diagram of a reversible shifting register in accordance with another embodiment of this invention.

Referring to the FIG. 6, another embodiment of this invention is shown which is a simplified version of the reversible shift register disclosed in the FIG. 2, where each of the coupling and storage cores are shown to be the same as is shift windings to each of these cores which are all primed. Here, the $I_R$ clock pulse source and the windings 44 on each of the coupling cores $K_1$, $K_2$, $K_3$ and $K_4$ are eliminated with source $I_A$ and $I_B$ again shown as A and B, repectively. Assuming the switch 34′ is in a position connecting the $I_A$ and $I_B$ clock pulse sources to the terminals $R_A'$ and $R_B'$ respectively, for shift right operation, and all cores are in the "0" state except the core $S_1'$ which is in the "1" state, a description of the circuit for shift right operation is subsequently described in detail with reference to the clock pulse sources $I_A$ and $I_B$ appearing as is shown in the FIG. 7.

Upon operation of the $I_A$ clock pulse source, a read signal is directed into the winding 36a′ on the cores $K_1'$ and $K_3'$ and the windings 38a′ on the cores $S_1'$ and $S_3'$, respectively. The core $S_1'$ is reset from the "1" to the "0" state and in so doing induces a voltage on the control winding 10′ with the dotted end positive causing a clockwise current in loop A′ which tends to write the cores $K_1'$ and $K_2'$ and charge the capacitor $C_1'$. Since the core $K_1'$ is held in the "0" state by the $I_A$ clock pulse directed into its winding 36a′ it is uneffected and the core $K_2'$ starts switching from the "0" to the "1" state and the condenser $C_1'$ starts charging. The core $K_2'$ in switching from the "0" to the "1" state induces a voltage on the winding 16′ with the undotted end positive causing a counter-clockwise current in loop B′ which tends to read the cores $S_2'$ and $K_3'$ and charge the capacitor $C_2'$ with a polarity which is opposite in sense to that of the condenser $C_1'$. Since the cores $S_2'$ and $K_3'$ are already in the "0" state only the capacitor $C_2'$ is charged. When the rate of change of flux in the core $K_2'$ reaches a maximum and starts decreasing, the capacitor $C_2'$ discharges and causes a clockwise current in loop B′ which tends to write the cores $K_3'$, $S_2'$ and $K_2'$. Since the core $K_3'$ is held in the "0" state by the $I_A$ clock pulse directed into its winding 38a′ it is uneffected. At the same time, the condenser $C_1'$ in the loop A′ also starts discharging to cause a counter-clockwise current in loop A′ which tends to read the cores $K_1'$, $S_1'$ and $K_2'$. Since the cores $K_1'$ and $S_1'$ are already in the "0" state, they are uneffected but the core $K_2'$ is in the "1" state and tends to be reset to the "0" state by the current in loop A′ due to the discharge of the condenser $C_1'$. When the core $S_1'$ was reset from the "1" to the "0" state, as described above, the energy transferred into the loop A′ by resetting of the core $S_1'$ is shared by the switching of the core $K_2'$ to the "1" state and the charging of the capacitor $C_1'$. The core $K_2'$ in switching to the "1" state transfers the shared energy to the loop B′ and hence to the capacitor $C_2'$, as described above; however, when a core is switched there is a certain amount of losses, here energy loss, which have been overcome in the prior art by providing a greater number of turns in the output winding, but here, the turns of each of the windings 14′ and 16′ on the core $K_2'$ are equal to insure that the current in loop B′ is less than the current developed in loop A′ so that the capacitor $C_2'$ is charged to a lower level than that of the capacitor $C_1'$. Thus this circuit makes use of the loss of energy inherent in such intermediate coupling cores between logical stages so that the capacitors or energy storage components have different charges thereon. Hence, since there is a greater current in the loop A′ due to the capacitor $C_1'$ discharging at the same time as the capacitor $C_2'$ in loop B′ discharges, the core $K_2'$ is reset from the "1" to the "0" state and the core $S_2'$ is switched from the "0" to the "1" state. Upon termination of the $I_A$ clock pulse, all cores are left in the "0" state and the "1" has been transferred from the core $S_1'$ to the core $S_2'$ which now remains in the "1" state.

Subsequently, the $I_B$ clock pulse source operates to provide resetting of the core $S_2'$ from the "0" to the "1" state and transfer of the "1" through the coupling core $K_3'$ from the storage core $S_2'$ into the storage core $S_3'$ by virtue of the action of the capacitors as described above for operation of the $I_A$ clock pulse source.

With the switch 34′ in the position so as to connect the $I_A$ and $I_B$ clock pulse sources with the terminals $L_A'$ and $L_B'$ respectively, and all the cores in the circuit of FIG. 6 left in the "0" state except the core $S_3'$ which was previously left in the "1" state, the circuit is now conditioned for shift left operation.

Upon operation of the $I_A$ clock pulse source, a read signal is directed into the windings 40a′ on the cores $K_2'$ and $K_4'$ and into the windings 42a′ on the cores $S_1'$ and $S_3'$. The core $S_3'$ is then reset from the "1" to the "0" state to induce a voltage on the control winding 26′ with its dotted end positive to cause a clockwise current in loop C′ which tends to write the cores $K_3'$ and $K_4'$ and to charge the capacitor $C_3'$. Since the core $K_4'$ is held in the "0" state by virtue of the $I_A$ clock pulse directed into its winding 40a′, the core $K_3'$ is switched from the "0" to the "1" state and the capacitor $C_3'$ starts charging. The core $K_3'$ in switching towards the "1" state induces a voltage on the winding 18′ with its undotted end positive causing a clockwise current in loop B′ which tends to read the cores $K_2'$ and $S_2'$ and charge the condenser $C_2'$. Since the cores $K_2'$ and $S_2'$ are already in the "0" state only the condenser $C_2'$ charges. As described above, the capacitor $C_2'$ is charged to a lower voltage value than the capacitor $C_3'$ since the transfer of energy through the coupling core $K_3'$ has an energy loss, which loss is reflected in the loss of voltage across the capacitor $C_2'$. When the rate of change of the flux in the core $K_3'$ reaches a maximum and starts decreasing, the capacitors $C_3'$ and $C_2'$ start discharging. The capacitor $C_3'$ in discharging causes a counterclockwise current in loop C′ which tends to read the cores $K_3'$, $S_3'$ and $K_4'$. At the same time the capacitor $C_2'$ in discharging causes a clockwise current in loop B′ which tends to read the cores $K_3'$, $S_2'$ and $K_2'$. Since the cores $K_2'$ and $K_4'$ are held in the "0" state by the $I_A$ clock pulse directed into their windings 40a′ and the core $S_3'$ is similarly held in the "0" state by the $I_A$ clock pulse directed into its windings 42a′ these cores are uneffected. The counter-clockwise current in loop C′ being greater than the clockwise current in loop B′ resets the core $K_3'$ from the "1" toward the "0" state while the clockwise current in loop B′ fully switches the core $S_2'$ from the "0" to the "1" state. Thus information has been transferred to the left from the core $S_3'$ to the core $S_2'$. Upon actuation of the $I_B$ clock pulse source the core $S_2'$ is reset and read out to provide information transfer through the core $K_2'$ into the core $S_1'$ in a manner similarly as described above wherein the loss of energy in transferring the information through the coupling core $K_2'$ is utilized to provide the reset of this core at a latter time.

Figure 8:
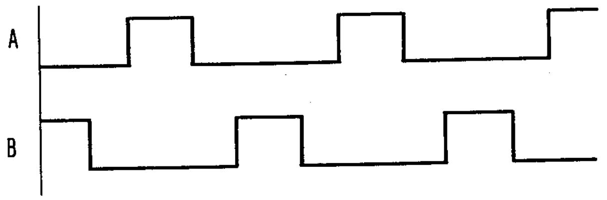
FIG. 8 illustrates the relative timing of current pulses which are required for operation of the circuits shown in the FIGS. 6 and 7.
Figure 7:
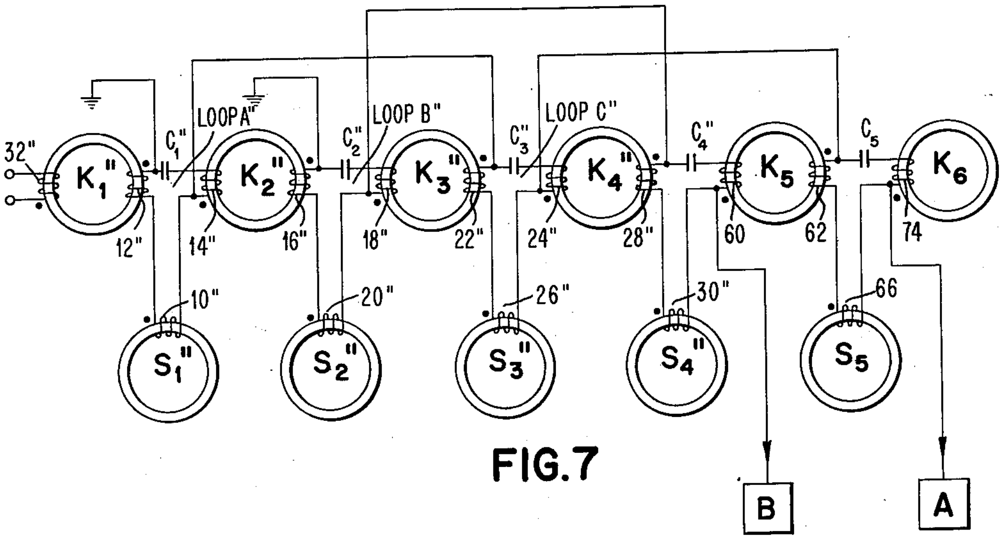
FIG. 7 is a circuit diagram of a shifting register in accordance with yet another embodiment of this invention.

Referring now to the FIG. 7, another embodiment of a shifting register which utilizes capacitors in the transfer loop is shown wherein the separate shift windings as shown in the embodiments of FIGS. 2 and 6 may be eliminated. Each of the elements utilized has the same reference designation as is shown in the embodiment of FIG. 6 and are double primed with elimination of the shift windings as previously described. A further transfer circuit has been added by provision of a core $K_5$ having a winding 60 connected with the capacitor $C_4''$ and the control winding 30″ on the core $S_4''$ and a winding 62 connected with a winding 74 on a further coupling core $K_6$ through a capacitor $C_5$ and a control winding 66 on a further storage core $S_5$. The shifting register herein disclosed is adapted to shift information to the right and the sequence of pulses required for the operation of the register of FIG. 7 is as shown in the FIG. 8 which are labelled A and B for the clock pulses $I_A$ and $I_B$. Initially, assume all cores are in the "0" state except the core $S_1''$ which is in the "1" state.

Upon operation of the $I_A$ clock pulse source, a read signal is directed into the windings 12'', 10'', 22'' and 26'', on the cores $K_1''$, $S_1''$, $K_3''$ and $S_3''$, respectively, which starts switching the core $S_1''$ from the "1" toward the "0" state and in so doing induces a voltage on the control winding 10'' with the dotted end positive which starts bucking this impressed signal. When the core $S_1''$ starts resetting from the "1" to the "0" state the $I_A$ clock pulse signal is then directed in a clockwise direction in loop A'' which tends to charge the capacitor $C_1''$ and write the core $K_2''$. The core $K_2''$ then switches from the "0" to the "1" state and in so doing induces a voltage in the winding 16'' with its undotted end positive causing a counter-clockwise current in loop B'' which tends to read the cores $S_2''$ and $K_3''$ and charge the capacitor $C_2''$ in a direction opposite with that of the polarity on the capacitor $C_1''$. When the core $S_1''$ is reset and there is no further flux change, the signal from the $I_A$ clock pulse source then chooses the path including the windings 12'' and 10'' on the cores $K_1''$ and $S_1''$ respectively, and the capacitor $C_1''$ and $C_2''$ start discharging. The capacitor $C_2''$ in discharging causes a clockwise current in loop B'' which tends to write the cores $K_3''$, $S_2''$ and $K_2''$. The core $K_3''$ is uneffected due to the $I_A$ clock pulse directed into its winding 22'' which holds this core in the "0" state at this time. The capacitor $C_1''$ in discharging causes a counter-clockwise current in loop A'' which tends to reset the core $K_2''$ to the "0" state and, as described above for the embodiment of FIG. 6, since the capacitor $C_1''$ is charged to a higher potential than the capacitor $C_2''$ due to the losses in the core $K_2''$ in transferring energy to the capacitor $C_2''$, the core $K_2''$ is reset from the "1" to the "0" state while the clockwise current in loop B'' sets the core $S_2''$ from the "0" to the "1" state. Upon termination of the $I_A$ clock pulse, all cores are left in the "0" state except the core $S_2''$ which has received information transferred thereto from the storage core $S_1''$. Subsequently the $I_B$ clock pulse source operates to direct a read signal into the windings 16'', 20'', 28'' and 30'' on the cores $K_2''$, $S_2''$, $K_4''$ and $S_4''$, respectively, which starts resetting the core $S_2''$ from the "1" to the "0" state and in so doing induces a voltage on the control winding 20'' with its dotted end positive tending to cause a clockwise current in loop B''. This switching of the core $S_2''$ then causes current to flow through the capacitor $C_2''$ and into the winding 18'' on the core $K_3''$ such as to write the core $K_3''$ and in so doing induces a voltage on the winding 22'' with its undotted end positive causing a counter-clockwise current in loop C'' which tends to read the cores $S_3''$ and $K_4''$ and charge the capacitor $C_3''$. When the core $S_2''$ is fully reset and the core $K_3''$ is set to the "1" state the $I_B$ clock pulse takes the path including the windings 16'' and 20'' on the cores $K_2''$ and $S_2''$ respectively, which allows the capacitors $C_2''$ and $C_3''$ to start discharging. The capacitor $C_3''$ in discharging causes a clockwise current in loop C'' which tends to write the cores $K_4''$, $S_3''$ and $K_3''$ while the capacitor $C_2''$ is discharging causes a clockwise current in loop B'' which tends to reset the core $K_3''$ to the "0" state. Since the $I_B$ clock pulse holds each of the cores $K_2''$, $S_2''$ and $K_4''$ in the "0" state by directing a signal into their windings 16'', 20'' and 28'', respectively, these cores are unaffected. The core $K_3''$ is then reset from the "1" to the "0" state while the core $S_3''$ is set from the "0" to the "1" state, thus information is transferred from the storage core $S_2''$ through the coupling core $K_3''$ into the storage core $S_3''$.

In the interest of providing a complete disclosure, details of the shifting registers wherein ferrite cores are employed is given below, however it is to be understood that other components, values and current magnitudes may be employed with satisfactory operation attained so that the values given should not be considered limiting with the clock pulses $I_A$ and $I_B$ delivering a constant current of 1.0 ampere, the windings *36a, 36b, 38a, 38b, 40a, 40b, 42a* and *42b* may comprise ten turns, and with the clock pulse source $I_R$ delivering a constant current of 1.0 ampere, the windings 44 may comprise five turns. In the coupling circuits interconnecting the storage and coupling cores, the windings 10, 12, 14, 16, 18, 20, 22, 24, 26, 28, 30, 32, 60, 62, 64 and 66 may comprise fifteen turns, with the capacitors $C_1$, $C_2$, $C_3$, $C_4$ and $C_5$ of 0.005 microfarad.

Each of the storage and coupling cores may comprise toroids of manganese-magnesium ferrite composition having an outside diameter of 0.115 inch, inside diameter of 0.080 inch and thickness of 0.055 inch.

It is significant that each of the windings in the transfer loops have the same number of turns lending fabrication ease to such circuits. Further, since the number of turns in the windings on the coupling cores are equal the circuits are amenable the bi-directional information flow. Thus, while there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a circuit, a bistable magnetic core, an output winding on said core, a capacitor connected in series arrangement with said output winding, first means coupled to said core for setting said core from a first to a second stable state whereupon said capacitor is charged, and second means for resetting said core to the first stable state independently of and coincidentally with said discharge of said capacitor to augment current flow along said series arrangement.

2. In a circuit, a first and a second bistable magnetic core, an output winding on said first core, an input winding on said second core, a first capacitor, means connecting said output winding with said input winding in a series circuit arrangement with said first capacitor, first means coupled to said first core for switching said first core from a first to a second stable state to cause said capacitor to be charged, and second means coupled to said first core for resetting said first core to said first stable state independently of and coincidently with the discharge of said capacitor to increase current flow along said circuit arrangement and said input winding so as to switch said second core from said first to said second stable state.

3. The circuit of claim 2 wherein said first and said second means include in common an input winding on said first core connected in series arrangement with second capacitor.

4. The circuit of claim 3 wherein said input and said output windings on said first core and said input winding on said second core have equal turns.

5. A device for coupling adjacent circuits comprising a bistable coupling magnetic core, an input and an output winding on said coupling core, a first circuit arrangement including a first capacitor serially connected with said input winding, a second circuit arrangement including a second capacitor serially connected with said output winding, means for energizing said first arrangement to switch said coupling core from a first to a second stable state and charge said first capacitor, said second arrangement being responsive to said coupling core upon switching to charge said second capacitor, said first and said second capacitors being arranged to discharge through said input and said output windings, respectively, oppositely with respect to said coupling core, said first capacitor upon discharging being effective to reset said coupling core from said second to said first stable state independently of and concurrently with the discharge of said second capacitor through said output winding to increase current flow along said second circuit arrangement.

6. A device as set forth in claim 5, wherein said first and second windings have an equal number of turns.

7. In a magnetic core shift register, a plurality of bistable storage magnetic cores, control winding means on said cores, a bistable coupling magnetic core arranged intermediate said storage cores, a first and a second winding on said coupling core, circuit means connecting the control winding on one storage core and the first winding on said coupling core in series with a capacitor, further circuit means connecting the control winding on another storage core and the second winding of said coupling core in series with a further capacitor, means for alternately reading out said storage cores to cause a distribution of energy to said coupling core and the capacitor serially connected with the storage core read out so that said coupling core is switched from a datum to an opposite stable state whereupon energy is transferred into said further capacitor, said capacitors upon discharging adapted to cause said coupling core to be established in said datum stable state and the succeeding storage core to be established in said opposite stable state.

8. The register of claim 7, wherein the control winding on said storage core is connected with the first winding on said coupling core in the same sense and the control winding on said other storage core is connected with the second winding on said coupling core in the same sense.

9. The register of claim 7, wherein said capacitors are discharged simultaneously.

References Cited in the file of this patent

UNITED STATES PATENTS

| | | |
|---|---|---|
| 2,713,675 | Schmitt | July 19, 1955 |
| 2,749,451 | Talambiras | June 5, 1956 |
| 2,832,062 | Tracy | Apr. 22, 1958 |
| 2,847,659 | Kaiser | Aug. 12, 1958 |
| 2,866,178 | Lo et al. | Dec. 23, 1958 |
| 2,894,151 | Russell | July 7, 1959 |

FOREIGN PATENTS

| | | |
|---|---|---|
| 1,128,056 | France | Jan. 2, 1957 |